Jan. 27, 1942.                P. M. SCHUFTAN                2,270,852
                            SEPARATING OF GAS MIXTURES
                              Filed March 28, 1940
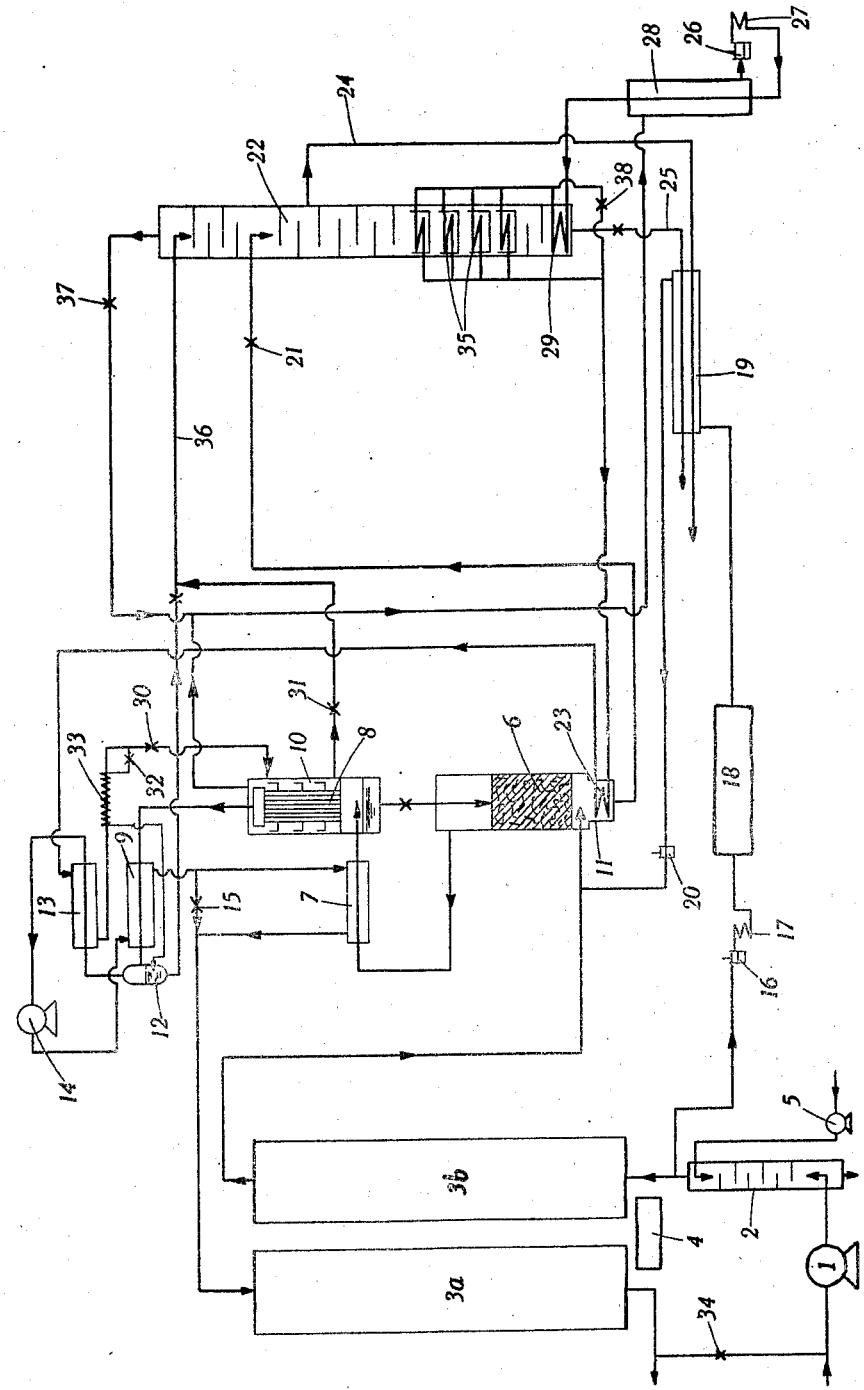
INVENTOR
PAUL MAURICE SCHUFTAN
BY A. W. Deller
ATTORNEY Patented Jan. 27, 1942

2,270,852

UNITED STATES PATENT OFFICE 2,270,852

SEPARATING OF GAS MIXTURES

Paul Maurice Schuftan, Richmond Hill, England, assignor to The British Oxygen Company Limited, London, England Application March 28, 1940, Serial No. 326,464
In Great Britain March 24, 1939

32 Claims. (Cl. 62—175.5)

The present invention relates to the separation of gas mixtures and is applicable to the extraction of ethylene by cooling from gas mixtures, such, for example, as coke-oven gas, low temperature carbonization gas, carburetted water gas, cracking gases, and the like, which contain ethylene in admixture with constituents of higher boiling point such as propylene, propane, ethane, carbon dioxide, hydrogen sulphide, water vapour, etc., and with constituents of lower boiling point such as hydrogen, nitrogen, carbon monoxide, methane etc.

Where there is any considerable quantity of carbon dioxide in the gas mixture the extraction of ethylene is made difficult by the fact that at the temperature at which ethylene begins to condense, the carbon dioxide in the gas will have condensed into its solid form which would cause serious obstruction of the plant by, for instance, choking the valves or fractionating trays.

According to this invention, there is provided a process for the extraction of ethylene from a gas mixture, wherein periodically alternating regenerators are employed for effecting a preliminary purification and cooling of the gas mixture, with subsequent separation of ethylene by further cooling and rectification. By the expression "periodically alternating regenerators" is meant two or two sets of regenerators, one or one set being used to purify and cool the gas mixture while the other or other set is being cooled by the gas from which the ethylene has been extracted, a reversal taking place at regular intervals so that the regenerator which has been purifying and cooling the gas is cooled, and the regenerator which has been cooled is used to purify and cool the gas.

In order to ensure a high yield of ethylene, the temperature of the gas cooled in the regenerators should be maintained within such limits that the average carbon dioxide content is near the limit or in excess of its solubility in the first condensate formed in the subsequent cooling operations but is low enough for the carbon dioxide to be kept in solution during the later stages of the process.

The gas cooled in the regenerators and containing the controlled amount of carbon dioxide is treated in a contacting device with a liquid of a lower temperature to eliminate a substantial proportion of the carbon dioxide. The mass of liquid with which the gas is brought into contact and/or the heat capacity of the contacting device should be kept sufficiently large to obtain equalization of temperature, composition and rate of flow of the gas.

The gas after contacting with the liquid of lower temperature is further cooled in one or more tubular coolers in order to extract the ethylene by condensation, at least one of these coolers being designed as a reflux cooler.

The gas mixture is initially boosted to a low pressure, sufficient to revapourize during the cooling down period of the regenerators the condensates present therein and to permit of the production of a part of the necessary cold by adiabatic expansion. The adiabatic expansion is effected after elimination of the ethylene and preferably after slight preheating to prevent formation of condensates during expansion.

A further part of the necessary cold may be produced by a methane refrigerating cycle, said cycle also serving to transfer the heat evolved as a result of the condensation of ethylene from the gas leaving the regenerators, to the temperature level required for the revapourization of condensates containing ethylene.

Due to its relatively low partial pressure, the ethylene is condensed from the gas leaving the regenerators at a much lower temperature than that at which it will have to be revapourized and, therefore, the heat of condensation will have to be extracted from the gas at a lower temperature level than that at which the heat of vapourization has to be supplied.

When using a methane refrigerating cycle for the condensation and revapourization of condensates containing ethylene, heat available as a result of cooling, condensing and sub-cooling the methane in the cycle can be utilised for the vapourization of the condensates containing ethylene, while the methane thus liquefied is used at a lower pressure level to condense ethylene fractions from the gas leaving the regenerators.

One or more rectification columns are provided in order to obtain a concentrated and purified ethylene fraction from the condensates formed in the tubular coolers, the rectification serving at the same time to produce the amount of methane required to replenish the methane refrigerating cycle. This methane may in part be derived from the crude ethylene fraction and in part from a crude methane fraction obtained by a further slight cooling of the gas substantially free from ethylene which emerges from the tubular coolers.

It will in most cases be found necessary to provide means for preventing in the methane cycle an enrichment of any constituents having boiling points higher or lower than that of methane. Those impurities of higher boiling point present in the crude methane fraction are eliminated in the aforesaid rectification column(s) before the methane is admitted to the refrigerating cycle but if such impurities should subsequently enrich in the refrigerating cycle, they are removed therefrom by effecting a fractional vapourization of the liquid methane used to condense ethylene in the reflux cooler, the vapourization of the methane taking place simultaneously with the condensation of the ethylene. The fraction containing the higher boiling point impurities thereby produced is fed to a rectification column where the impurities are eliminated and the purified methane fraction returned to the cycle. This column is heated at the base with or without additional heating of another part, preferably by means of compressed methane. The elimination of constituents having a lower boiling point than methane is effected prior to introducing any fractions into the rectification column(s) by heating the fractions to the required degree. The liquid ethylene fraction free from any constituents of lower boiling point thus obtained may be wholly or partly freed by rectification from constituents of higher boiling points which it contains, such as ethane, propylene, carbon dioxide, etc. For this rectification either compressed methane or ethylene may be used as heating medium, and depending upon the degree of purity of the ethylene to be obtained, either the crude ethylene fraction free from methane or ethylene from a cycle may be used as reflux liquid. In the former case, the rectification can be performed in a compound column in which both the required methane and ethylene fractions are simultaneously produced. In the latter case, separate columns may be provided.

This invention will now be described in further detail with reference to the accompanying drawing which shows by way of example a schematic arrangement of a suitable plant for extracting ethylene from coke oven gas.

The coke oven gas is fed to a booster 1 where it is compressed, preferably to a pressure of between 1½ and 3 atmospheres absolute and, after passing through a cooler 2 to remove the heat of compression and to condense water and naphthalene, is led into one or other of a pair of periodically alternating regenerators 3a, 3b, the mechanism for effecting the periodic alternation of the regenerators being indicated by the reference numeral 4. The cooler 2 is preferably constructed as a scrubbing tower, into which cooling water supplied by a pump 5 is sprayed.

Preferably, the incoming raw gases are made to flow upwardly through the regenerators, and the free section of the storage material in the regenerators is preferably such as to permit backward flow of the condensates. Under such conditions, non-vapourized liquid condensates tend, owing to gravity, to flow or to be carried into the warmer zones near the entrance and can be vapourized there.

When the amount of condensation in the regenerators becomes considerable, as in the present case, the liquid film on the surface of the storage mass in the regenerator will tend to flow downwardly into warmer zones where the liquid will be evaporated and in consequence will be subjected to a rectification effect; with a downwards direction of flow, the liquid condensates would tend to flow into colder zones and would thereby take up a certain quantity of the ethylene in solution, diminishing the yield thereof. A further advantage of an upwards direction of flow is that any excess of water in the raw gas will remain in the warmer zones of the regenerator from which it will be easily eliminated upon reversal of the regenerators.

In the ensuing description it will be assumed that regenerator 3a has been pre-cooled whilst regenerator 3b is in the process of being cooled down by effluent gas from which ethylene has been removed as hereinafter described. The liquids and solids condensed in regenerator 3a will be retained in this regenerator while the lower boiling point constituents will pass through it. Ethylene boils at a lower temperature than carbon dioxide and therefore if the temperature of the regenerator is kept within certain limits a substantial separation of the ethylene from the carbon dioxide can be obtained. When, after a predetermined lapse of time, the alternation of the regenerators takes place, the gas from which the ethylene has been extracted is passed through regenerator 3a at a lower pressure so that the carbon dioxide and other constituents retained in this regenerator are re-vapourized at the same time as the regenerator is cooled.

During this preliminary purification the average temperature of regenerator 3a should, as mentioned above, not be so low that all or substantially all the carbon dioxide is retained in the regenerator, for under these conditions a substantial quantity of ethylene would also be retained. The temperature of the gases cooled in the regenerator 3a is therefore kept within such temperature limits that (1) at the beginning of the warming-up period a substantial amount of ethylene condenses in the regenerator together with carbon dioxide and constituents of higher boiling point; but at later stages of the warming-up period revapourization of ethylene takes place, and (2) the regenerators are switched over at such a temperature that the average carbon dioxide content of the gas leaving regenerator 3a is as high as possible without there being so much that the amount of solid carbon dioxide, if any, formed during the further treatment as hereinafter described will cause obstruction to the plant.

From the gas, prepurified and precooled in regenerator 3a, the ethylene is extracted by further cooling and rectification. This further cooling is effected by passing the gas from regenerator 3a into a contacting device 6 and thence through tubular coolers comprising a pre-condenser 7, and a main condenser 8 in which a crude ethylene fraction condenses, and an after-cooler 9, the main condenser 8 being constructed as a reflux cooler. The crude fractions condensed in the pre-condenser 7 and main condenser 8 are combined and returned to the contacting device 6 to be used therein as washing agent. The contacting device 6 which acts as a direct cooler and cold storer may comprise a washing or rectification column containing a filling mass such as Raschig rings or trays ensuring good contact between gas and liquid, the whole having a heat capacity as large as is practicable without loss of efficiency. In the contacting device the fluctuations in temperature, volume and composition of the gas leaving the regenerator 3a are considerably reduced in order that as constant conditions as possible are obtained in the further cooling and rectification stages. At the same time, the increasing amounts of carbon dioxide contained in the gas leaving the regenerator at the later stages of the warming-up period will either be condensed as a result of the cooling, or be washed out by the liquid, so that substantially all the carbon dioxide will be present in the crude ethylene fraction in the base of the contacting device 6. The carbon dioxide retained in this liquid will mainly be in solution but an excess may be suspended therein in solid form.

The cold supplied to the tubular coolers is derived from two sources. That supplied to the pre-condenser 7 and the after-condenser 9, which may be constructed as counter-current heat exchangers, is derived from cooled gases from which the ethylene has already been extracted. On the other hand, the cold supplied to the main condenser 8 is derived from a jacket 10 of boiling liquid methane. As mentioned above, condenser 8 is constructed as a reflux cooler and comprises a vertical bundle of tubes which is surrounded by the jacket 10. This jacket may be provided with a plurality of trays in order that, while the gas passing through the bundle of tubes is cooled, a fractional vapourization of the methane simultaneously takes place and a liquid fraction containing any higher boiling point impurities collects at the bottom of the jacket whence it can be removed and treated as hereinafter described in a rectification column to recover a substantially pure methane fraction. The gas traversing the bundle of tubes in condenser 8 is caused to flow in an upwards direction so that condensates flow downwards in counter-current to the gas. During the cooling of this gas, the temperature will progressively fall as the gas passes up the condenser and condensates poorer and poorer in ethylene are formed so that the gas leaving the condenser is substantially free from ethylene.

As mentioned above, the crude ethylene condensed in the main condenser 8 together with the condensate formed in the pre-condenser 7 is returned to the contacting device 6 to be used as washing agent. A crude ethylene fraction collects in a vessel 11 at the base of the contacting device 6 and is withdrawn therefrom to be subjected to further fractionation as hereinafter described in order to recover therefrom a concentrated and purified ethylene fraction.

Instead of using the aforementioned contacting device to cool the gas leaving the regenerator so as to prevent excess carbon dioxide from entering the tubular heat exchangers, the same result may be achieved by cooling the gas in any other convenient way. For example, a cooling liquid may be injected in atomized condition into the gas leaving the purifying regenerator.

The gas practically free from ethylene which leaves the main condenser 8 is subjected to further cooling in two successive stages. In the first stage the gas is slightly cooled in the after-cooler 9 to condense a small amount of methane which collects in a separator 12, this liquid crude methane fraction being subsequently purified and concentrated as hereinafter described. In the second stage, the gas leaving the separator 12 is adiabatically expanded and the cold, expanded gas is returned to after-cooler 9 and pre-cooler 7 to act as cooling medium therein. For this expansion a turbine 14 is provided and may conveniently be coupled to a blower, dynamo or other power consumer (not shown). Prior to passing into the turbine, the gas may be slightly heated in a heater 13 to prevent too great a fall in temperature during expansion with consequent formation of condensates. After passing through pre-condenser 7, the returning gas is led into regenerator 3b, which is thereby cooled simultaneously with the removal of condensates deposited during the previous period.

It is advantageous to provide a means of controlling the temperature of the returning gases entering the regenerator to be cooled in order to ensure complete vapourization of the constituents retained in it. This may be done by by-passing through the valve 15, which may be operated automatically, a part of the gas which cools the pre-condenser 7, so that such by-passed portion enters the regenerator 3b direct. By this means the temperature of the gases returning to the regenerators can be so adjusted as to be a maximum at the beginning of the cooling down period and to diminsh gradually in the later stages of this period.

In addition to the pre-condenser 7 which, as regards the cold gas returning to the regenerators, functions as a heater, an extra heater for the returning gas may be provided, if necessary. Such a controlled heat supply will lower the temperature differences at the cold ends of the regenerators and therefore facilitate evapourization of the condensates. In addition, it will allow of the necessary control of the temperature limits within which the precooled gas has to leave the regenerators.

As a result of ethylene extraction, the gas returning to the regenerator which is being cooled will have a smaller heat capacity than the gas which has passsed through the purifying regenerator. Therefore, in order to provide the amount of cold necessary for cooling the raw gas to the desired average temperature, the temperature of the gases returning to the regenerators would have to be correspondingly lower. The resulting temperature difference at the cold ends of the regenerators, would, however, render the revapourization of the condensates much more difficult.

To overcome this difficulty a small percentage of the raw gas to be treated, hereinafter called "auxiliary gas" is diverted from the main stream of raw coke oven gas, freed from carbon dioxide, further cooled by continuous heat interchange and admixed with the bulk of the gas cooled in the regenerators. The auxiliary gas is compressed to a higher pressure than the main gas stream, being preferably diverted from the main stream after the raw gas has been subjected to the initial boosting. In this way the heat capacity of the returning gas can be made substantially equal to that of the gas to be cooled and as a result of this the temperature drop in the purifying regenerator becomes nearly equal to the temperature rise in the regenerator being cooled. By this means, not only does the temperature difference at the cold ends become a minimum but the volume of the outgoing gases is increased at the same time, both factors facilitating the revapourization of the condensates in the regenerators.

As shown in the drawing, the auxiliary gas is first compressed, the booster 1 conveniently constituting the first stage of compression and a compressor 16 the second stage. After passing through an after-cooler 17 the gas is freed from carbon dioxide in an absorber 18. The auxiliary gas is then passed through a heat exchanger 19 in counter-current both to ethylene and to higher boiling point constituents which form the final products of separation as hereinafter described. During the passage of the auxiliary gas through the heat exchanger 19, higher boiling point constituents such as propylene are condensed and may be withdrawn.

The auxiliary gas is then adiabatically expanded in an engine 20 with recovery of external work, whereby the temperature is reduced substantially to that of the gas leaving the purifying regenerator 3a; the two gases are mixed prior to entering the contacting device 6.

The condensate obtained in vessel 11 at the base of the contacting device 6 contains practically the whole of the ethylene present in the gases leaving the regenerator, but will be admixed with some constituents of lower and higher boiling points. Preferably, the crude ethylene fraction in vessel 11 is heated substantially to its equilibrium temperature at the working pressure of the rectification column before it reaches any valves or rectification trays. This heating is effected by means of a heating coil 23 traversed by compressed methane. The temperature rise thereby resulting not only effects the dissolution of any solid carbon dioxide but at the same time eliminates a considerable amount of undesirable lower boiling constituents. As an alternative, the condensate may be passed through a heat exchanger before reaching the rectification column, and this exchanger may at the same time constitute the condenser of the column.

For further rectification and concentration, the crude ethylene fraction from vessel 11 is fed through valve 21 into the rectification column 22. The latter comprises the necessary number of rectification trays or other elements to effect the desired degree of rectification and is also provided with means for vapourizing the fluids in the lower part of the column. This may be effected by means of compressed methane traversing suitable vapourizers. These vapourizers may be disposed outside and/or inside the column, the preferred arrangement being that shown in the drawing where a heating coil 29 is arranged in the base of the column, and each tray for some distance up the column is provided with a supplementary heating coil 35. As a result of the rectification which takes place in the column, methane is first vapourized from the condensate fed to the column and any ethylene contained in the resulting vapours will be eliminated therefrom in the upper part of column 22 by means of a reflux liquid which is supplied to the uppermost part of the column as hereinafter described. Methane will emerge from the top of column 22 through a regulating valve 37 with only little admixture or loss of ethylene and can be used to replenish the methane refrigerating cycle.

The constituents of higher boiling points may be separated from the crude ethylene fraction in the lower part of the column where they will be eliminated to the desired extent from the rising vapours by the descending reflux liquid. In order to permit the necessary adjustment of the heat supply to the column, coil 29 may be arranged in series with coils 35 and a valve-controlled bye-pass 38 may be provided to control the amount of compressed methane passing through coils 35.

The purified ethylene fraction, admixed only with ethane, some methane and carbon dioxide, leaves column 22 in gaseous state through conduit 24 and is then warmed up by the auxiliary gas in heat exchanger 19 to nearly the cooling water temperature.

From the base of column 22 a small fraction containing any constituents of higher boiling point, which may be present, are withdrawn through conduit 25 and also passed through the heat exchanger 19 to cool the auxiliary gas.

As mentioned above, the enrichment of constituents having boiling points higher and lower than that of methane, in the refrigerating cycle has to be avoided. For the elimination of the constituents of lower boiling point, a separator may be arranged behind the expansion valve 30 for the methane. Preferably, however, the constituents of lower boiling point are removed from the crude methane and crude ethylene fractions prior to their further treatment. Such removal has already been described for the crude ethylene fraction where it is effected in vessel 11 by means of the heating coil 23. The elimination of lower boiling point constituents from the crude methane fraction is effected by contacting it with gaseous methane in the separator 12. As shown in the drawing, a small amount of compressed gaseous methane is withdrawn from the methane cycle, expanded through valve 32 and, after passing through the coil 33 in heat exchange with the gas, is directly introduced into the crude methane in the separator 12. This injected methane will liquefy in the colder condensate, and the latent heat thereby liberated will cause the lower boiling point constituents, such as carbon monoxide and hydrogen to be driven off from this condensate.

After elimination of the lower boiling point constituents, the condensate in separator 12 is led through conduit 36 to the upper part of column 22 where it serves as the aforementioned reflux liquid and at the same time is freed from higher boiling point impurities. This liquid, while descending the column eliminates any ethylene contained in the rising vapours with a corresponding vapourization of methane.

By this means it is possible to keep the methane obtained at the top of the rectification column practically free from constituents of lower boiling point and to avoid an enrichment of such constituents in the methane refrigerating cycle.

The elimination of constituents of higher boiling point than methane in the refrigerating cycle will be avoided as far as possible by eliminating such constituents in column 22 as already described.

During the starting of the plant, or even during normal operation, higher boiling point constituents may enter the cycle and tend to enrich there, and as a result the temperature of the boiling methane would rise and the gas would be cooled insufficiently in the main condenser 8. The jacket 10 surrounding this condenser is therefore preferably fitted as aforesaid with a number of trays in order to obtain a fractional vapourization of the liquid methane. Should any appreciable amounts of higher boiling point constituents be present in the cycle, these constituents will be obtained in concentrated form at the base of the condenser jacket. This enriched fraction is then passed through conduit 31 into the column 22 in order to be separated into methane and the higher boiling point constituents.

The refrigerating cycle comprises a four-stage compressor 26 by means of which gaseous methane may be compressed to a pressure of 800 to 1200 pounds per square inch. The usual intercoolers (not shown) are provided together with an after-cooler 27 and a heat exchanger 28, through which the compressed methane is passed in counter-current heat exchange with expanded methane. From the heat exchanger 28, the methane passes into the heating coils 29 and 35 of the column 22 thereafter passing on to the heating coil 23 of the contacting device 6. The methane is then passed through the heater 13 in which the gas passing into the turbine 14 is warmed up. The compressed methane which has thus been pre-cooled, compressed and sub-cooled is then expanded in valve 30 to about atmospheric pressure and the liquid so formed is fed to the jacket 10 for cooling the main condenser 8. Methane vapourized in this jacket is combined with the methane vapour from column 22 and is returned to the compressor 26 after passage through the heat exchanger 28.

In order to obtain the necessary amount of methane to operate the cycle when first starting the plant, the auxiliary gas cycle may be so designed as to allow of the production of pure methane during the time of starting of the plant. Once a sufficient quantity of methane has been produced, the auxiliary cycle will be switched over to its normal function.

In the foregoing example the simultaneous production of a methane and an ethylene fraction in a single compound column has been described, the column being heated with compressed methane, and crude fractions obtained in the tubular coolers used as reflux liquids.

In this way it is possible to obtain a methane of sufficient purity for the refrigerating cycle, and an ethylene fraction containing between 65 and 85% of ethylene admixed mainly with constituents of higher boiling point, such as ethane, and small amounts of propylene, carbon dioxide, etc.

If an ethylene fraction of a still higher concentration and purity is required, the production of the methane and ethylene fractions may be performed in two separate columns. The first column will serve to eliminate any methane from the various crude fractions as obtained in the tubular coolers, and the crude ethylene fraction free from methane thus obtained will be further rectified in a second column in which pure ethylene on the one hand and the constituents of higher boiling point on the other hand will be separated. This second column will preferably be heated by condensing pure ethylene and the resulting liquid used as a reflux. A part of the ethylene produced will, after being warmed in a counter-current exchanger, be compressed at least to the saturation pressure corresponding to the temperature of the liquid constituents of higher boiling point collecting at the base of the column. Thus, a part of the ethylene will be recirculated.

Before being introduced into the second rectification column the crude liquid ethylene fraction free from methane is preferably wholly or partly vapourized by compressed methane.

The starting up of the plant will be preferably performed by reintroducing into the booster the gas emerging from the regenerator, which is being cooled, a suitable connection including a valve 34 being provided for this purpose. The gas is then passed into the purifying regenerator, i. e. working takes place in a closed cycle, and only a small quantity of raw gas will be required to compensate for any losses. By this means any possible obstructions by solid deposits of water or carbon dioxide, which would otherwise during the starting of the plant be carried into parts of the equipment where they could not be revapourized during normal operation, will be avoided.

Prior to their introduction into the purifying regenerator, the gases to be worked up according to the present invention will have to be purified from any oxides of nitrogen which may be present, in order to avoid formation of gums in the apparatus. The raw gas or, preferably, only the auxiliary gas may also be purified from hydrogen sulphide.

With regard to naphthalene, an appreciable amount of it will be condensed in the aftercooler 2 of the booster. The naphthalene might be kept in solution there and/or completely eliminated from the gas by using naphthalene solvents in a manner known per se.

The storage mass of the regenerators should preferably consist of aluminium, which will not be corroded by the constituents of the gas, while for the other parts copper which may be tinned, will be suitable.

It will be understood that the process hereinbefore described may be used for the extraction of constituents of medium boiling point other than ethylene from a gas mixture containing at the same time constituents of higher boiling point which are liable to condense in solid state, by cooling, wherein periodically alternating regenerators are employed for effecting an elimination of the constituents of higher boiling point condensing in solid state to such an extent that the residue of these constituents still left in the gases cooled in the regenerators can be kept in solution during the subsequent separation of the medium boiling point constituents by further cooling and rectification.

I claim:

1. A process for extracting liqueflable organic constituents from a gas mixture which comprises precooling a gas mixture containing liquefiable organic constituents and a constituent of higher vaporization point which solidifies at about the temperature of the condensation range of the liqueflable constituents to solidify a major portion of said constituent of higher vaporization point and to condense a portion of the liquefiable organic constituents, thereby leaving a residue of uncondensed gases containing a minor portion of said constituent of higher vaporization point, vaporizing part of the condensed portion of liquefiable organic constituents together with a minor fraction of the solidified constituent of higher vaporization point, and further cooling said vaporized and uncondensed gases to fractionally condense and separate said liquefiable constituents therefrom.

2. A process for extracting liqueflable organic constituents from a gas mixture which comprises precooling a gas mixture containing carbon dioxide and liquefiable organic constituents of lower boiling point having a condensation range of about the temperature of the vaporization point of carbon dioxide to solidify a major portion of the carbon dioxide and to condense a portion of the liquefiable organic constituents, thereby leaving a residue of uncondensed gases including a minor portion of the carbon dioxide, vaporizing part of said condensate together with a minor fraction of the solidified carbon dioxide, and further cooling said vaporized and uncondensed gases to fractionally condense and separate said liqueflable constituents therefrom.

3. A process for extracting ethylene from a gas mixture containing ethylene and carbon dioxide which comprises precooling a gas mixture containing ethylene and carbon dioxide in admixture with other constituents to a temperature sufficient to condense a major portion of other constituents having a boiling point higher than ethylene and to solidify a major portion of the carbon dioxide and to condense a portion of the ethylene, thereby leaving a residue of uncondensed gases containing ethylene and other constituents of lower boiling point together with a minor portion of carbon dioxide and constituents of higher boiling point, vaporizing part of said condensate together with a minor fraction of the solidified carbon dioxide, and further cooling said vaporized and uncondensed gases to fractionally condense and separate ethylene therefrom.

4. A process for extracting ethylene from a gas mixture containing ethylene and carbon dioxide which comprises precooling a gas mixture containing ethylene and carbon dioxide in admixture with other constituents to a temperature sufficient to condense a maximum amount of constituents having a boiling point higher than ethylene and to leave in uncondensed form a major portion of ethylene and constituents of lower boiling point and a minor portion of carbon dioxide, and further cooling said uncondensed gases to separate ethylene therefrom by condensation.

5. A process for extracting ethylene from a gas mixture containing ethylene and carbon dioxide which comprises passing a gas mixture containing ethylene and carbon dioxide in admixture with other constituents into a precooled heat transfer chamber to condense constituents having a boiling point higher than ethylene together with a portion of ethylene and to solidify carbon dioxide therein whereby uncondensed gases including ethylene and constituents of lower boiling point can pass therethrough, vaporizing a major portion of said condensed ethylene and a minor portion of solidified carbon dioxide and condensed constituents of boiling point higher than ethylene, adding said vaporized gases to said uncondensed gases, and further cooling said mixture of vaporized and uncondensed gases to fractionally condense and separate ethylene therefrom.

6. A process for extracting ethylene from a gas mixture containing ethylene and carbon dioxide which comprises passing a gas mixture containing ethylene and carbon dioxide in admixture with other constituents into a precooled heat transfer chamber to condense constituents having a boiling point higher than ethylene together with a portion of ethylene and to solidify carbon dioxide therein whereby uncondensed gases including ethylene and constituents of lower boiling point can pass therethrough, vaporizing a major portion of said condensed ethylene and a minor portion of solidified carbon dioxide and condensed constituents of boiling point higher than ethylene, adding said vaporized gases to said uncondensed gases, further cooling said mixture of vaporized and uncondensed gases to fractionally condense and separate ethylene therefrom, recovering constituents of lower boiling point than ethylene, passing said constituents of lower boiling point into a second heat transfer chamber to precool said chamber, and alternating in operation to employ said heat transfer chambers as a regenerative system.

7. A process for extracting ethylene from a gas mixture containing ethylene and carbon dioxide which comprises precooling a gas mixture containing ethylene and carbon dioxide in admixture with other constituents to a temperature sufficient to condense a maximum amount of constituents having a boiling point higher than ethylene while permitting at least a part of the carbon dioxide to remain uncondensed together with uncondensed gases of lower boiling point, and further cooling said uncondensed gases to separate substantially all of the ethylene therefrom by condensing together with carbon dioxide and any residual constituents of higher boiling point.

8. A process for the extraction of ethylene from a gas mixture containing ethylene and carbon dioxide which comprises passing a gas mixture containing ethylene and carbon dioxide in admixture with other constituents into a precooled heat transfer area to condense a maximum amount of constituents having a boiling point higher than ethylene while permitting at least a part of the carbon dioxide to remain uncondensed together with gases of lower boiling point, withdrawing said uncondensed gases from the heat transfer area, controlling the temperature to which said gas mixture is precooled to regulate the amount of carbon dioxide permitted to remain uncondensed whereby obstruction by solid deposits of carbon dioxide in subsequent steps are avoided, further cooling the withdrawn gases to separate therefrom a crude condensate containing substantially all of the ethylene together with carbon dioxide and residual constituents of higher boiling point, vaporizing said crude condensate, and separating ethylene therefrom.

9. A process for the extraction of ethylene from a gas mixture containing ethylene and carbon dioxide which comprises passing a gas mixture containing ethylene and carbon dioxide in admixture with other constituents into a precooled heat transfer area to condense a maximum amount of constituents having a boiling point higher than ethylene while permitting at least a part of the carbon dioxide to remain uncondensed together with gases of lower boiling point, withdrawing said uncondensed gases from the heat transfer area, controlling the temperature to which said gas mixture is precooled to regulate the amount of carbon dioxide permitted to remain uncondensed whereby obstruction by solid deposits of carbon dioxide in subsequent steps are avoided, further cooling the withdrawn gases to separate therefrom a crude condensate containing substantially all of the ethylene together with carbon dioxide and residual constituents of higher boiling point, vaporizing said crude condensate, rectifying the gases resulting from said vapors, and separating ethylene therefrom.

10. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, and further cooling the emerging gases to condense substantially all the ethylene therefrom together with carbon dioxide and residual constituents of higher boiling point.

11. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, passing said gaseous mixture through the heat transfer chamber in an upward direction with a velocity sufficiently low to permit backward flow of condensates formed, and further cooling the emerging gases to condense substantially all the ethylene therefrom together with carbon dioxide and residual constituents of higher boiling point.

12. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permiting at least a part of the carbon dioxide to remain uncondensed and to emerge from said chamber together with uncondensed gases of lower boiling point and residual constituents of higher boiling point, further cooling the emerging gases to condense substantially all the ethylene therefrom together with carbon dioxide and residual constituents of higher boiling point, recovering constituents of lower boiling point than ethylene, passing said constituents of lower boiling point into a second heat transfer chamber to precool said chamber, progressively decreasing the temperature of the gas thus passed into said second heat transfer chamber to provide the highest temperature at the beginning of the cooling period and the lowest temperature at the end of said period, and alternating in operation to employ said heat transfer chambers as a regenerative system.

13. A process for extracting ethylene from a gas mixture containing ethylene and carbon dioxide which comprises boosting a gas mixture containing ethylene and carbon dioxide in admixture with other constituents to a slight pressure, passing said slightly compressed gas mixture into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, further cooling the emerging gases to condense substantially all the ethylene therefrom together with carbon dioxide and residual constituents of higher boiling point, recovering constituents of lower boiling point than ethylene, passing said constituents of lower boiling point into a second heat transfer chamber to precool said chamber at a pressure sufficiently below the pressure of the gas mixture passing into the first heat transfer chamber to revaporize condensates present in said second chamber during the cooling period and to produce a part of the necessary cold by adiabatic expansion, and alternating in operation to employ said heat transfer chambers as a regenerative system.

14. A process for extracting ethylene from a gas mixture containing ethylene and carbon dioxide which comprises dividing a gas mixture containing ethylene and carbon dioxide in admixture with other constituents into two unequal portions, passing the major portion of said gas mixture into a first precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, further cooling the emerging gases to condense substantially all the ethylene therefrom together with carbon dioxide and residual constituents of higher boiling point, recovering constituents of lower boiling point than ethylene, separating carbon dioxide from the minor portion of the gas mixture containing ethylene and carbon dioxide in admixture with other constituents to provide an auxiliary gas, further cooling said auxiliary gas by continuous heat interchange, admixing the cooled auxiliary gas after separating ethylene and constituents having a boiling point higher than ethylene with said constituents of lower boiling point recovered from the major portion of the gas mixture to form a precooling gas, thereby regulating the temperature of said precooling gas, passing said precooling gas into a second heat transfer chamber to precool said chamber whereby the temperature drop in said second chamber is approximately the same as the temperature rise in the first chamber, and alternating in operation to employ said heat transfer chambers as a regenerative system.

15. A process for extracting ethylene from a gas mixture containing ethylene and carbon dioxide which comprises boosting a gas mixture containing ethylene and carbon dioxide in admixture with other constituents to a slight pressure, dividing said slightly compressed gas mixture into two unequal portions, passing the major portion of said gas mixture into a first precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, further cooling the emerging gases to condense substantially all the ethylene therefrom together with carbon dioxide and residual constituents of higher boiling point, recovering constituents of lower boiling point than ethylene, separating carbon dioxide from the minor portion of the gas mixture containing ethylene and carbon dioxide in admixture with other constituents to provide an auxiliary gas, further cooling said auxiliary gas by continuous heat interchange, admixing the cooled auxiliary gas after separating ethylene and constituents having a boiling point higher than ethylene with said constituents of lower boiling point recovered from the major portion of the gas mixture to form a precooling gas, thereby regulating the temperature of said precooling gas, passing said precooling gas into a second heat transfer chamber to precool said chamber at a pressure sufficiently below the pressure of the gas mixture passing into the first heat transfer chamber to revaporize condensates present in said second chamber during the cooling period and to produce a part of the necessary cold by adiabatic expansion whereby the temperature drop in said second chamber is approximately the same as the temperature rise in the first chamber, and alternating in operation to employ said heat transfer chambers as a regenerative system.

16. The process set forth in claim 15 wherein the minor portion of the gas mixture containing ethylene and carbon dioxide in admixture with other constituents is compressed to a higher pressure than the major portion of said gas mixture.

17. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, and contacting the emerging gases with a liquid of a lower temperature to eliminate a substantial proportion of the carbon dioxide whereby ethylene can be recovered.

18. The process set forth in claim 17 wherein the liquid of lower temperature is of sufficient volume to reduce fluctuations in temperature, composition and rate of flow of the emerging gases.

19. The process set forth in claim 17 wherein the emerging gases are contacted with the liquid of lower temperature in a contacting device having a large heat capacity whereby substantial equalization of temperature, composition and rate of flow of said emerging gases can be obtained.

20. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, contacting the emerging gases with a liquid of a lower temperature to eliminate a substantial proportion of the the carbon dioxide, and further cooling said gases in at least one tubular cooler to form a condensate whereby ethylene is extracted by condensation.

21. The process set forth in claim 20 wherein the condensate in at least one of said tubular coolers is refluxed.

22. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permititng at least a part of the carbon dioxide to remain uncondensed and to emerge from said chamber together with uncondensed gases of lower boiling point and residual constituents of higher boiling point, contacting the emerging gases with a liquid of a lower temperature to eliminate a substantial proportion of the carbon dioxide, further cooling said gases in at least one tubular cooler to form a condensate containing ethylene and to leave uncondensed gases of lower boiling point, adibatically expanding said uncondensed gases of lower boiling point to reduce the temperature thereof, and passing said expanded gases in heat exchange with a gas mixture containing ethylene to aid in cooling the same and in condensing ethylene whereby ethylene can be recovered.

23. The process set forth in claim 22 wherein the uncondensed gases of lower boiling point recovered from the tubular coolers are slightly preheated before adiabtic expansion, thereby preventing the formation of condensate therein during expansion.

24. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to join with emerging gases from said heat transfer chamber together with uncondensed gases of lower boiling point and residual constituents of higher boiling point, compressing methane, precooling said methane by heat exchange, effecting heat exchange between said precooled methane and a liquid ethylene fraction to liquefy said methane and to vaporize said ethylene fraction, under-cooling the liquefied methane, expanding said liquefied methane, cooling the emerging gases from said heat transfer chamber with said expanded liquefied methane whereby the methane is vaporized and whereby substantially all the ethylene in said emerging gases together with carbon dioxide and residual constituents of higher boiling point are condensed, further warming the vaporized methane, and recompressing said methane whereby the methane can be returned to a methane refrigerating cycle.

25. A process for extracting ethylene from a gas mixture containing ethylene and carbon dioxide which comprises passing a gas mixture containing ethylene and carbon dioxide in admixture with other constituents into a precooled heat transfer chamber, controlling the temperature of said chamber to condense the maximum amount of constituents having a boiling point higher than ethylene while permitting at least a part of the carbon dioxide to remain uncondensed and to emerge from said chamber together with uncondensed gases of lower boiling point and residual constituents of higher boiling point, further cooling the emerging gases, and rectifying said gases to eliminate constituents having boiling points higher or lower than ethylene and to condense substantially all the ethylene therefrom.

26. The process set forth in claim 25 wherein the gases are rectified in at least one rectification column heated at least at the base thereof.

27. The process set forth in claim 25 wherein the heat used for rectifying said gases is furnished in heat interchange by at least one member of the group consisting of compressed methane and compressed ethylene.

28. The process set forth in claim 25 wherein the gases are rectified in a compound rectification column to condense a concentrated and purified ethylene fraction therefrom and to produce a substantially pure methane fraction.

29. The process set forth in claim 24 wherein the emerging gases are rectified to separate constituents having boiling points higher or lower than ethylene and to condense substantially all the ethylene therefrom, and additionally comprising slightly cooling the rectified gas to condense a crude fraction containing methane, and refluxing said crude fraction in the rectification step whereby said methane can be purified and adapted for use in the methane refrigerating cycle.

30. The process set forth in claim 24 wherein the emerging gases are rectified to separate constituents having boiling points higher or lower than ethylene and to condense substantially all the ethylene therefrom, and additionally comprising slightly cooling the rectified gas to condense a crude fraction containing methane, fractionally vaporizing the condensed methane to provide purified methane and to form a liquid residue enriched in constituents of higher boiling point, and removing said liquid residue whereby impurities of higher boiling point present in the methane refrigerating cycle can be withdrawn.

31. The process set forth in claim 24 wherein the emerging gases are rectified to separate constituents having boiling points higher or lower than ethylene and to condense substantially all the ethylene therefrom, additionally comprising slightly cooling the rectified gas to condense a crude fraction containing methane, heating said crude fraction to vaporize constituents of lower boiling point whereby said constituents can be withdrawn from the methane refrigerating cycle, and refluxing said crude fraction in the rectification step whereby said methane can be purified and adapted for use in the methane refrigerating cycle.

32. The process set forth in claim 24 wherein the emerging gases are rectified to separate constituents having boiling points higher or lower than ethylene and to condense substantially all the ethylene therefrom, additionally comprising slightly cooling the rectified gas to condense a crude fraction containing methane, contacting the crude fraction with gaseous methane to heat said fraction, thereby vaporizing constituents of lower boiling point whereby said constituents can be withdrawn from the methane refrigerating cycle, and refluxing said crude fraction in the rectification step whereby said methane can be purified and adapted for use in the methane refrigerating cycle.

PAUL MAURICE SCHUFTAN.